(12) United States Patent
Hou et al.

(10) Patent No.: US 10,803,606 B2
(45) Date of Patent: Oct. 13, 2020

(54) TEMPORALLY CONSISTENT BELIEF PROPAGATION SYSTEM AND METHOD

(71) Applicants: National Taiwan University, Taipei (TW); Himax Technologies Limited, Tainan (TW)

(72) Inventors: Hsin-Yu Hou, Taipei (TW); Sih-Sian Wu, Taipei (TW); Da-Fang Chang, Taipei (TW); Liang-Gee Chen, Taipei (TW)

(73) Assignees: National Taiwan University, Taipei (TW); Himax Technologies Limited, Tainan (TW)

( * ) Notice: Subject to any disclaimer, the term of this patent is extended or adjusted under 35 U.S.C. 154(b) by 293 days.

(21) Appl. No.: 16/040,294

(22) Filed: Jul. 19, 2018

(65) Prior Publication Data
US 2020/0027220 A1 Jan. 23, 2020

(51) Int. Cl.
| | | |
|---|---|---|
| G06T 7/285 | (2017.01) | |
| G06T 7/246 | (2017.01) | |
| G06T 7/90 | (2017.01) | |
| H04N 13/271 | (2018.01) | |
| H04N 13/00 | (2018.01) | |

(52) U.S. Cl.
CPC .............. *G06T 7/285* (2017.01); *G06T 7/248* (2017.01); *G06T 7/90* (2017.01); *H04N 13/271* (2018.05); *G06T 2207/10021* (2013.01); *H04N 2013/0077* (2013.01); *H04N 2013/0081* (2013.01); *H04N 2013/0085* (2013.01)

(58) Field of Classification Search
None
See application file for complete search history.

(56) References Cited

U.S. PATENT DOCUMENTS

| | | | | |
|---|---|---|---|---|
| 8,737,723 B1* | 5/2014 | Kwatra | ............... | G06T 15/205 |
| | | | | 382/154 |
| 2007/0122028 A1* | 5/2007 | Sun | .................... | G06K 9/32 |
| | | | | 382/154 |
| 2010/0220932 A1* | 9/2010 | Zhang | ................. | G06K 9/6297 |
| | | | | 382/209 |
| 2011/0110583 A1* | 5/2011 | Zhang | ................... | G06T 7/579 |
| | | | | 382/154 |
| 2012/0098932 A1* | 4/2012 | Kim | ...................... | G06T 7/593 |
| | | | | 348/43 |
| 2012/0262543 A1* | 10/2012 | Lee | ......................... | G06T 7/97 |
| | | | | 348/43 |
| 2013/0136299 A1* | 5/2013 | Kim | ...................... | G06T 7/215 |
| | | | | 382/103 |
| 2015/0085085 A1* | 3/2015 | Liu | ........................ | G06T 7/593 |
| | | | | 348/51 |

\* cited by examiner

*Primary Examiner* — Carol Wang
(74) *Attorney, Agent, or Firm* — Donald E. Stout; Stout, Uxa & Buyan, LLP

(57) ABSTRACT

A temporally consistent belief propagation system includes a disparity map buffer that provides a disparity map of a previous time; a belief propagation unit that generates an energy function according to a first image of a present time, a second image of the present time, a first image of the previous time and the disparity map of the previous time; and a disparity generating unit that generates a disparity map of the present time according to the energy function.

14 Claims, 5 Drawing Sheets

TEMPORALLY CONSISTENT BELIEF PROPAGATION SYSTEM AND METHOD

BACKGROUND OF THE INVENTION

1. Field of the Invention

The present invention generally relates to image processing, and more particularly to a temporally consistent belief propagation system and method.

2. Description of Related Art

The requirement of accurate depth information becomes more important in light of the prospered development of autonomous cars, 3D interaction and augmented reality. In order to get the disparity map of the environment, many complex algorithms have been proposed to improve the performance.

The belief propagation (BP) technique is successful in image stereo matching problem. However, when we consider stereo matching for videos, directly applying the BP algorithm frame by frame ordinarily results in unsatisfactory temporally inconsistent disparity maps.

A need has thus arisen to propose a novel scheme that performs favorably against conventional methods in the stereo video datasets, and solves problems induced by conventional methods like error propagation from previously occluded regions.

SUMMARY OF THE INVENTION

In view of the foregoing, it is an object of the embodiment of the present invention to provide a temporally consistent belief propagation system and method with effective temporal consistency and real-time feasibility.

According to one embodiment, a temporally consistent belief propagation system includes a disparity map buffer, a belief propagation unit and a disparity generating unit. The disparity map buffer provides a disparity map of a previous time. The belief propagation unit generates an energy function according to a first image of a present time, a second image of the present time, a first image of the previous time and the disparity map of the previous time. The disparity generating unit generates a disparity map of the present time according to the energy function.

DETAILED DESCRIPTION OF THE INVENTION

Figure 1:
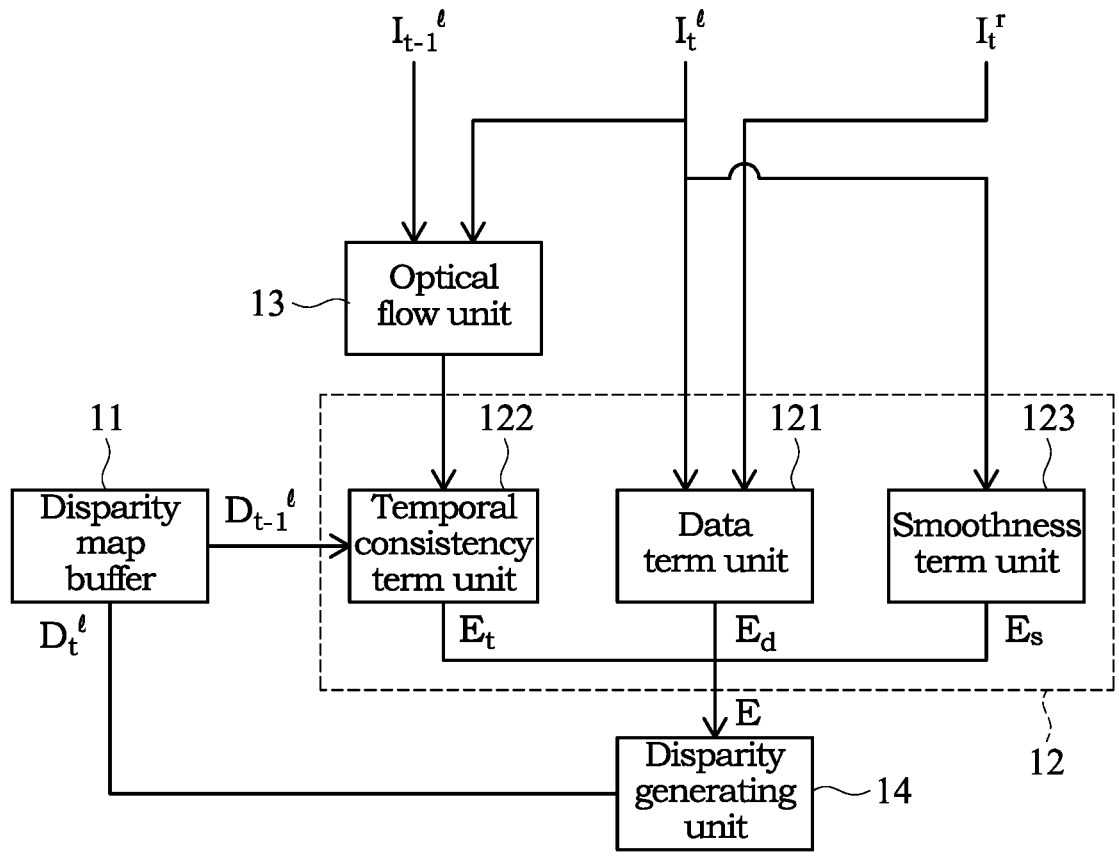
FIG. 1 shows a block diagram illustrating a temporally consistent belief propagation system according to one embodiment of the present invention.
Figure 2:
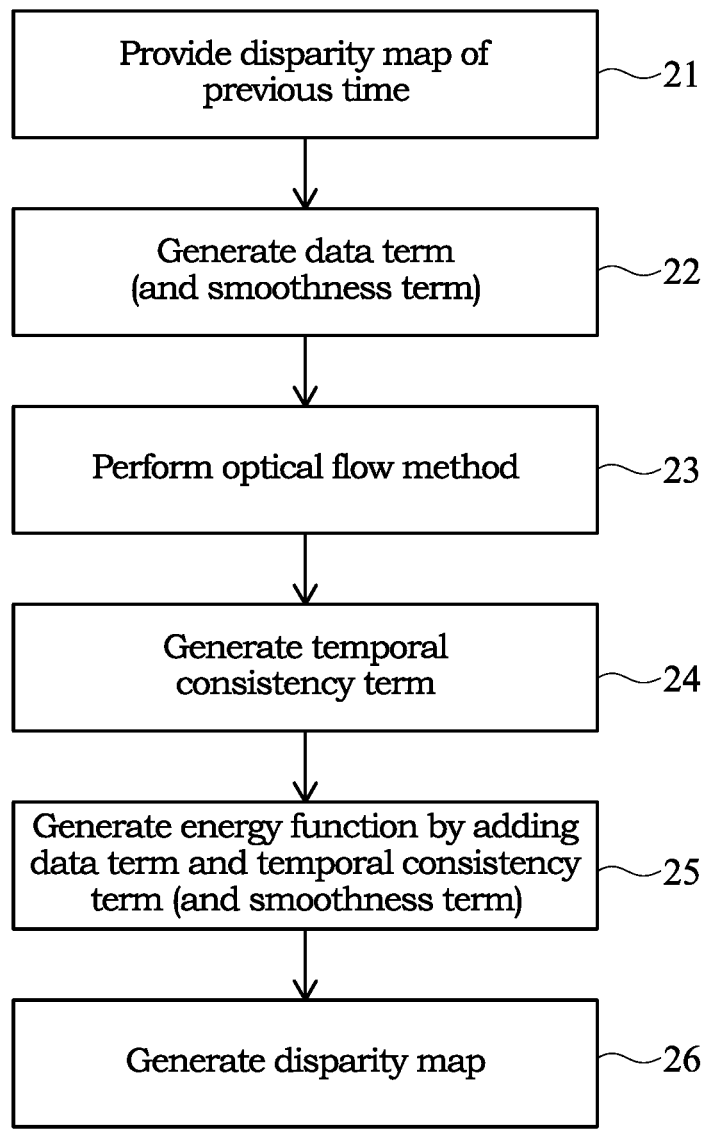
FIG. 2 shows a flow diagram illustrating a temporally consistent belief propagation method associated with the temporally consistent belief propagation system of FIG. 1.

FIG. 1 shows a block diagram illustrating a temporally consistent belief propagation system 100 according to one embodiment of the present invention, and FIG. 2 shows a flow diagram illustrating a temporally consistent belief propagation method 200 associated with the temporally consistent belief propagation system 100 of FIG. 1. It is appreciated that the order of performing the temporally consistent belief propagation method 200 may be different from that shown in FIG. 2. The temporally consistent belief propagation system ("system" hereinafter) 100 of the embodiment may be implemented, for example, by a digital image processor.

In the embodiment, the system 100 may include a disparity map buffer 11 configured to store and provide a disparity map $D_{t-1}^1$ of a previous time t-1 (step 21). The disparity map buffer 11 may include a memory such as static random-access memory (SRAM) or dynamic random-access memory (DRAM).

The system 100 of the embodiment may include a (temporally consistent) belief propagation (BP) unit 12 configured to generate an energy function E according to a first image (or frame) $I_t^1$ (e.g., left image) of a present time t, a second image (or frame) $I_t^r$ (e.g., right image) of the present time, a first image $I_{t-1}^1$ of the previous time and the disparity map $D_{t-1}^1$ of the previous time.

Figure 3A:
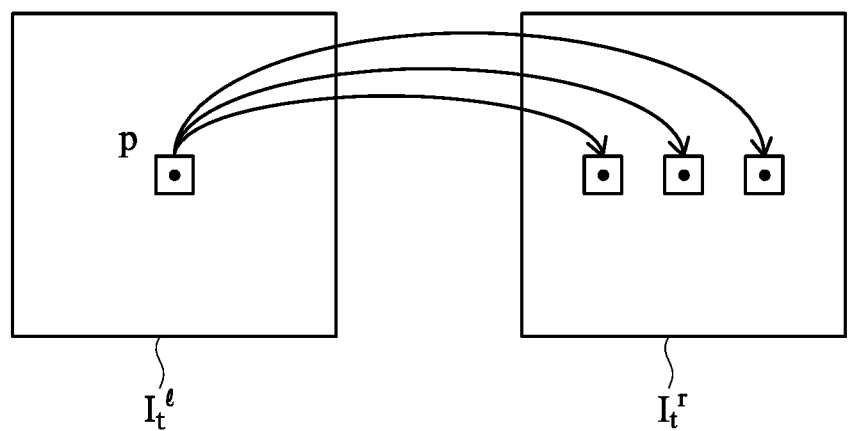
FIG. 3A exemplifies a first image of the present time and a second image of the present time.
Figure 3B:
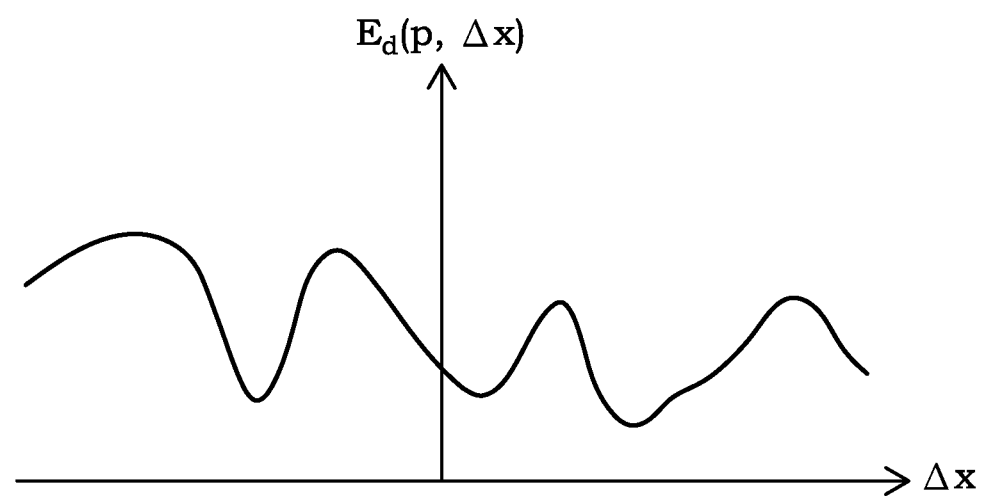
FIG. 3B shows the data term with respect to disparity.

Specifically, the BP unit 12 of the embodiment may include a data term unit 121 configured to generate a data term $E_d$ of the energy function E according to the first image $I_t^1$ of the present time and the second image $I_t^r$ of the present time (step 22). FIG. 3A exemplifies a first image $I_t^1$ of the present time and a second image $I_t^r$ of the present time, which are subjected to stereo matching for a patch (or a block) containing a pixel p and its adjacent pixels. In one embodiment, sum of absolute differences (SAD) may, for example, be used as a measure of similarity between the first image $I_t^1$ of the present time and the second image $I_t^r$ of the present time. According to the performed stereo matching, the data term $E_d$ (e.g., SAD) with respect to disparity Δ x may be obtained as exemplified in FIG. 3B.

In one embodiment, the data term $E_d$ may be generated by using an adaptive support-weight (ASW) method disclosed in "Adaptive support-weight approach for correspondence search," entitled to Kuk-Jin Yoon et al., IEEE Transactions on Pattern Analysis and Machine Intelligence (TPAMI), vol. 28, no. 4, pp. 650-656, 2006, the disclosure of which is incorporated herein by reference.

Figure 4A:
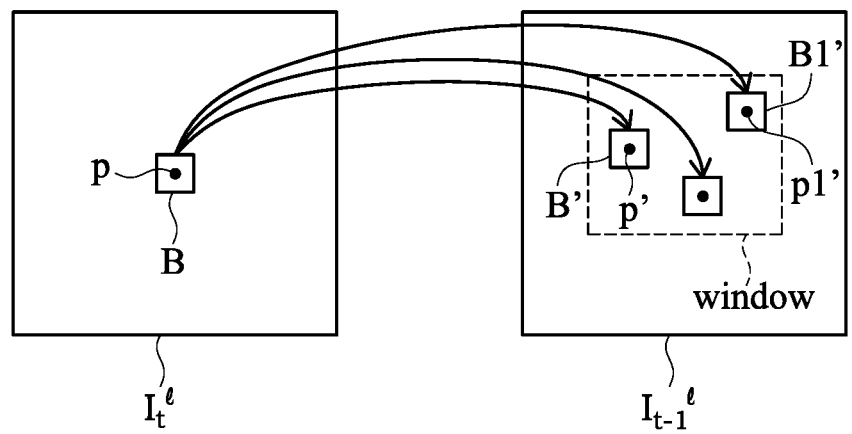
FIG. 4A exemplifies a first image of the present time and a first image of the previous time.

According to one aspect of the embodiment, the system 100 may include an optical flow unit 13 configured to perform an optical flow (method) on the first image $I_t^1$ of the present time and the first image $I_{t-1}^1$ of the previous time (step 23). FIG. 4A exemplifies a first image $I_t^1$ of the present time and a first image $I_{t-1}^1$ of the previous time, which are subjected to similarity matching for a patch (or a block) B containing a center pixel p and its adjacent pixels on the first image $I_t^1$ of the present time, in order to find at least one similar patch B' with a center pixel p' within a predefined window on the first image $I_{t-1}^1$ of the previous time. In one embodiment, sum of absolute differences (SAD) may, for example, be used as a measure of similarity between the first image $I_t^1$ of the present time and the first image $I_{t-1}^1$ of the previous time. It is appreciated that two or more similar patches (e.g., patches B' and B1' with center pixels p' and p1', respectively) may be found on the first image $I_{t-1}^1$ of the previous time.

According to another aspect of the embedment, the BP unit 12 may include a temporal consistency term unit 122 configured to generate a temporal consistency term $E_t$ of the energy function E according to the disparity map $D_{t-1}^1$ of the previous time and a result of the optical flow unit 13 (step 24).

Figure 4B:
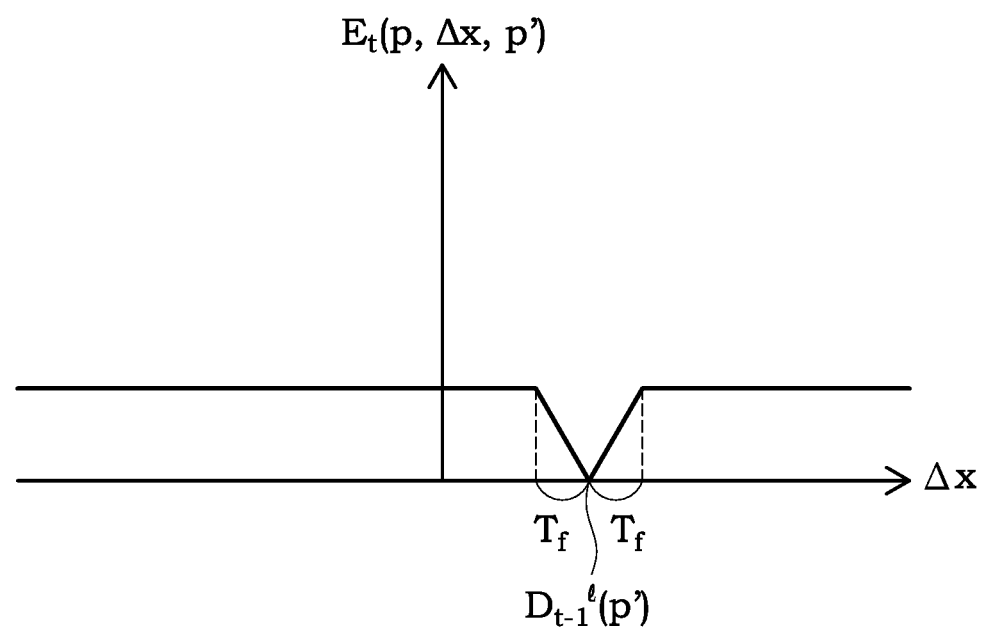
FIG. 4B shows the temporal consistency term with respect to disparity.

Specifically, the temporal consistency term unit 122 firstly obtains disparity of a center pixel p' of at least one similar patch B' on the first image $I_{t-1}^1$ of the previous time. If two or more similar patches (e.g., B' and B1') are considered, a weighted sum of respective disparities of center pixels p' and p1' may be obtained as the disparity. Based on the obtained disparity, the temporal consistency term $E_t$ with respect to disparity $\Delta x$ may then be obtained as exemplified in FIG. 4B. This temporal consistency term $E_t$ punishes disparities which are far from the disparity value of the previous frame, $D_{t-1}^1(p')$. In the example, the temporal consistency term $E_t$ is confined to a predetermined range, for example, $(-T_f, +T_f)$, for increasing robustness, where $T_f$ is a predetermined truncated factor. Moreover, (the absolute value of) the slope of the temporal consistency term $E_t$ may be determined according to the similarity between the patch of the previous time and the patch of the present time. Accordingly, the mere similar the corresponding patches between the previous time and the present time are, the larger the slope is which means the penalty is larger.

In one embodiment, the temporal consistency term $E_t$ of the embodiment may be defined as $$E_t(p, \Delta x, p') = W_f(B, B') \cdot \min(|\Delta x - D_{t-1}^1(p')|, T_f)$$

$$W_f(B, B') = \frac{\alpha}{2^{S(B,B')}}$$

where B represents a patch of the present time which centers on the pixel p, B' represents a patch of the previous time which centers on the corresponding pixel p', $W_f$ represents an adapted weight, $\alpha$ represents a predetermined parameter that should balance cost from stereo matching and a previous frame cue, and min( ) denotes a minimum function that takes two inputs and gives an output the minimum of the two inputs.

According to a further aspect of the embedment, the adaptive weight $W_f$ is determined according to the similarity score S that represents unlikelihood of the patch of the previous time to the patch of the present time. The similarity score S may be generated according to the first image $I_t^1$ of the present time and the first image $I_{t-1}^1$ of the previous time. Accordingly, a higher similarity (or smaller similarity score S) indicates that the adaptive weight $W_f$ will become larger. In other words, the more similar the corresponding patches between the previous time and the present time are, the more the temporal consistency term is, thereby rendering the energy function E (and thus the disparity values or the disparity map) be more temporally smooth. To the contrary, less similarity (i.e., smaller adaptive weight $W_f$) between the patch of the previous time and the patch of the present time may indicate mismatching or occlusion cases, and the smaller adaptive weight $W_f$ decreases the energy function E (and thus disparity values or the disparity map), thereby avoiding error being propagated to a next frame.

In the embodiment, the energy function E may be generated by adding the data term $E_d$ and the temporal consistency term $E_t$ (step 25), and the energy function E may be represented by $$E(p, \Delta x) = E_d(p, \Delta x) + E_t(p, \Delta x, p')$$

where p represents a pixel, $\Delta x$ represents a disparity value and p' means the corresponding pixel of the pixel p from previous frame acquired from an optical flow method.

Figure 5:
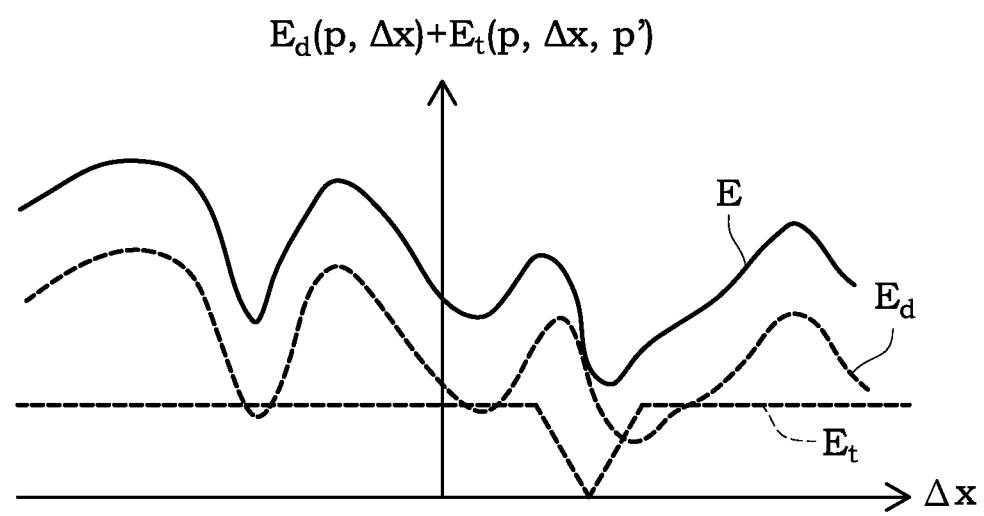
FIG. 5 exemplifies the data term and the temporal consistency term to be added to generate the energy function.

FIG. 5 exemplifies the data term $E_d$ and the temporal consistency term $E_t$, which are then added to generate the energy function E. The disparity $\Delta x$ at which the minimum energy function locates may then be determined (i.e., $\Delta x$ of pixel p, $D_t^1(p) = \min(E_d(p, \Delta x) + E_t(p, \Delta x, p'))$. It is noted that the temporal consistency term $E_t$ of the embodiment is added into the energy function E instead of scaling the data term $E_d$ as in the conventional system. Accordingly, the strong data term $E_d$ can thus be preserved.

In one embodiment, the BP unit 12 of the embodiment may optionally include a smoothness term unit 123 configured, in step 22, to further generate a smoothness term (also called pairwise term) $E_s$ of the energy function E according to (e.g., color difference between adjacent pixels of) the first image $I_t^1$ of the present time. In the embodiment, the smoothness term $E_s$ is generated by adopting a truncated linear model disclosed in "Efficient belief propagation for early vision," entitled to Pedro F Felzenszwalb et al., International Journal of Computer Vision (IJCV), vol. 70, no. 1, pp. 41-54, 2006, the disclosure of which is incorporated herein by reference. Specifically, the smoothness term $E_s$ may include a weight that is set according to color difference between adjacent pixels.

If the smoothness term $E_s$ is generated, the energy function E may be generated, in step 25, by adding the data term $E_d$, the smoothness term $E_s$ and the temporal consistency term $E_t$ (step 25), and the energy function E may be represented by $$E(p, \Delta x) = E_d(p, \Delta x) + E_s(p, \Delta x) + E_t(p, \Delta x, p').$$

The system 100 of the embodiment may include a disparity generating unit 14 configured to generate a disparity map $D_t^1$ of the present time according to the energy function E (from the BP unit 12) (step 26). In the embodiment, a winner-takes-all scheme is adopted to generate the disparity map $D_t^1$ of the present time.

According to the embodiment disclosed above, a temporal consistency term $E_t$ is added into the energy function E to provide temporal consistency. The embodiment can preserve the representative data term $E_d$ through the temporal consistency term $E_t$ instead of scaling the data term $E_d$ directly. The temporal consistency term $E_t$ includes an adaptive weight $W_f$ based on similarity between the patch of the previous time and the patch of the present time. Moreover, compared with the conventional systems requiring both the previous and upcoming frames, the embodiment requires only one image $I_{t-1}^1$ of the previous time, thus making real-time application feasible.

Although specific embodiments have been illustrated and described, it will be appreciated by those skilled in the art that various modifications may be made without departing from the scope of the present invention, which is intended to be limited solely by the appended claims.

What is claimed is:

1. A temporally consistent belief propagation system, comprising:

a disparity map buffer that provides a disparity map of a previous time;

a belief propagation unit that generates an energy function according to a first image of a present time, a second image of the present time, a first image of the previous time and the disparity map of the previous time;

an optical flow unit that performs an optical flow on the first image of the present time and the first image of the previous time; and a disparity generating unit that generates a disparity map of the present time according to the energy function;

wherein the belief propagation unit comprises a temporal consistency term unit that generates a temporal consistency term of the energy function according to the disparity map of the previous time and a result of the optical flow unit;

wherein the temporal consistency term unit obtains disparity of a center pixel of at least one patch on the first image of the previous time, according to which the temporal consistency term with respect to disparity is obtained.

2. The system of claim 1, wherein the belief propagation unit comprises:

a data term unit that generates a data term of the energy function according to the first image of the present time and the second image of the present time.

3. The system of claim 2, wherein the data term unit performs stereo matching between the first image of the present time and the second image of the present time, thereby generating the data term with respect to disparity.

4. The system of claim 1, wherein the optical flow unit performs similarity matching between the first image of the present time and the first image of the previous time to find at least one similar patch within a predefined window on the first image of the previous time.

5. The system of claim 1, wherein a slope of the temporal consistency term with respect to disparity is determined according to a similarity between a patch of the previous time and a patch of the present time, wherein the more similar corresponding patches between the previous time and the present time are, the larger the slope is.

6. The system of claim 1, wherein the energy function is generated by adding the data term and the temporal consistency term.

7. The system of claim 1, wherein the belief propagation unit comprises:

a smoothness term unit that generates a smoothness term of the energy function according to color difference between adjacent pixels on the first image of the present time.

8. A temporally consistent belief propagation method, comprising:

(a) providing a disparity map of a previous time;

(b) generating an energy function according to a first image of a present time, a second image of the present time, a first image of the previous time and the disparity map of the previous time;

(c) performing an optical flow on the first image of the present time and the first image of the previous time; and (d) generating a disparity map of the present time according to the energy function;

wherein step (b) comprises generating a temporal consistency term of the energy function according to the disparity map of the previous time and a result of the optical flow;

wherein the temporal consistency term with respect to disparity is obtained by the following steps:

obtaining disparity of a center pixel of at least one patch on the first image of the previous time; and obtaining the temporal consistency term with respect to disparity based on the obtained disparity.

9. The method of claim 8, wherein step (b) comprises:

generating a data term of the energy function according to the first image of the present time and the second image of the present time.

10. The method of claim 9, wherein the data term with respect to disparity is generated by performing stereo matching between the first image of the present time and the second image of the present time.

11. The method of claim 8, wherein the optical flow is executed by performing similarity matching between the first image of the present time and the first image of the previous time to find at least one similar patch within a predefined window on the first image of the previous time.

12. The method of claim 8, wherein a slope of the temporal consistency term with respect to disparity is determined according to a similarity between a patch of the previous time and a patch of the present time, wherein the more similar corresponding patches between the previous time and the present time are, the larger the slope is.

13. The method of claim 8, wherein the energy function is generated by adding the data term and the temporal consistency term.

14. The method of claim 8, wherein step (b) comprises:

generating a smoothness term of the energy function according to color difference between adjacent pixels on the first image of the present time.

* * * * *